(12) United States Patent
Amalfitano et al.

(10) Patent No.: US 10,473,101 B2
(45) Date of Patent: *Nov. 12, 2019

(54) PUMP MOTOR FOR HIGH TEMPERATURE FLUIDS

(71) Applicant: Nidec Motor Corporation, St. Louis, MO (US)

(72) Inventors: Mark S. Amalfitano, St. Louis, MO (US); Jeffrey S. Sherman, Creve Coeur, MO (US); Steven R. Palmer, Highland, IL (US); John H. Hussey, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,160

(22) Filed: Mar. 28, 2019

(65) Prior Publication Data

US 2019/0219054 A1 Jul. 18, 2019

Related U.S. Application Data

(63) Continuation of application No. 15/351,106, filed on Nov. 14, 2016, now Pat. No. 10,302,082.

(60) Provisional application No. 62/254,595, filed on Nov. 12, 2015.

(51) Int. Cl.
| | |
|---|---|
| *F04C 15/00* | (2006.01) |
| *F04C 2/344* | (2006.01) |
| *H02K 7/14* | (2006.01) |
| *H02K 5/124* | (2006.01) |

(52) U.S. Cl.
CPC ........ *F04C 15/0034* (2013.01); *F04C 2/3447* (2013.01); *F04C 15/0038* (2013.01); *H02K 5/124* (2013.01); *H02K 7/14* (2013.01)

(58) Field of Classification Search
CPC ............... F04C 15/003; F04C 15/0034; H02K 2205/09; H02K 5/124; H02K 5/15
See application file for complete search history.

(56) References Cited

U.S. PATENT DOCUMENTS

| | | | |
|---|---|---|---|
| 3,576,380 A * | 4/1971 | Sargeant | ................. B60S 1/481 417/423.11 |
| 3,897,178 A * | 7/1975 | Palloch | ................... F04D 13/06 417/368 |

(Continued)

*Primary Examiner* — Mary Davis
(74) *Attorney, Agent, or Firm* — Hovey Williams LLP (57) ABSTRACT

A motorized pump assembly includes a pump and a motor for driving the pump. The pump includes a pump housing that at least in part defines a pump chamber. The motor includes a stator, a rotor rotatable about an axis, a motor housing, and a bearing assembly. The rotor includes a motor shaft extending along the axis. The motor housing includes an endshield that at least in part defines a motor chamber in which the stator and the rotor are at least substantially received. The bearing assembly rotatably supports the motor shaft on the endshield. The pump housing and the endshield are fixed to one another and cooperatively at least in part define an overflow chamber adjacent the pump chamber. The endshield defines a drainage channel fluidly interconnected with the overflow chamber and configured to direct fluid from the overflow chamber away from the bearing assembly.

20 Claims, 9 Drawing Sheets

(56) References Cited

U.S. PATENT DOCUMENTS

| | | | | |
|---|---|---|---|---|
| 4,776,768 A | * | 10/1988 | Kondoh | B60T 13/148 |
| | | | | 277/573 |
| 4,992,690 A | * | 2/1991 | Baker | H02K 5/124 |
| | | | | 277/429 |
| 5,077,503 A | * | 12/1991 | Tamura | H02K 5/10 |
| | | | | 310/88 |
| 7,001,159 B2 | * | 2/2006 | Peterson, Jr. | F04D 29/106 |
| | | | | 277/427 |
| 8,585,378 B2 | * | 11/2013 | Fadler | H02K 5/15 |
| | | | | 417/423.1 |

* cited by examiner

PUMP MOTOR FOR HIGH TEMPERATURE FLUIDS

CROSS-REFERENCE TO RELATED APPLICATION

The present application is a continuation of U.S. patent application Ser. No. 15/351,106, filed Nov. 14, 2016, which claims the benefit of and priority from U.S. Provisional Patent Application No. 62/254,595, filed Nov. 12, 2015, each of which is entitled PUMP MOTOR FOR HIGH TEMPERATURE FLUIDS, and the entire disclosure of each of which is hereby incorporated by reference herein.

BACKGROUND OF THE INVENTION

1. Field of the Invention

The present invention relates generally to a motorized pump assembly. More particularly, the present invention relates to a motorized pump assembly suited for driving a high temperature fluid such as cooking oil (e.g., as in a fryer).

2. Discussion of the Prior Art

Those of ordinary skill in the art will appreciate that motorized pump assemblies often comprise a pump (e.g., a centrifugal or axial flow pump) mounted to and driven by a motor (e.g., an electric or gas-powered motor). The pump preferably includes a pump chamber that houses a pump element. The motor preferably drives the pump element (e.g., rotationally) such that the pump element acts upon fluid in the pump chamber. For instance, the pump element might draw fluid from a pump inlet into a pump chamber, then direct fluid from the pump chamber to a pump outlet.

The pump and/or the motor are often provided with one or more seals therebetween to at least substantially restrict transfer of liquid from the pump chamber to the motor chamber. Furthermore, one or more seals might be associated with bearing assemblies operable to rotatably support pump and/or motor components.

Although motorized pump assemblies may be configured for use with any one or more of a variety of fluids, certain challenges are particularly pertinent to pump assemblies for use with high temperature fluids. For instance, exposure to high and/or fluctuating temperatures may result in detrimental effects associated with thermal expansion and/or contraction of components, particularly those comprising disparate materials. High temperatures may also have detrimental effects on bearing assemblies. More particularly, elevated temperatures may, among other things, result in changes to bearing lubricant consistency and consequent bleeding or other failures to efficiently lubricate the bearing; oxidation and subsequent carbon formation, which may lock or j am the bearing; reduced hardness of bearing components; and/or loss of internal clearance and/or preloading results (e.g., due to thermal expansion and/or contraction). Such detrimental effects may lead to premature wear of the bearing assemblies and associated decreases in motor performance and general longetivity.

SUMMARY

According to one aspect of the present invention, a motorized pump assembly comprises a pump and a motor for driving the pump. The pump is configured to act on a fluid. The pump includes a pump housing that at least in part defines a pump chamber. The motor includes a stator, a rotor rotatable about an axis, a motor housing, and a bearing assembly. The rotor includes a motor shaft extending along the axis. The motor housing includes an endshield that at least in part defines a motor chamber in which the stator and the rotor are at least substantially received. The bearing assembly rotatably supports the motor shaft on the endshield. The pump housing and the endshield are fixed to one another and cooperatively at least in part define an overflow chamber adjacent the pump chamber. The endshield defines a drainage channel fluidly interconnected with the overflow chamber and configured to direct fluid from the overflow chamber away from the bearing assembly. The endshield defines a pump mounting hole. The pump mounting hole intersects the drainage channel.

BRIEF DESCRIPTION OF THE DRAWING FIGURES

Preferred embodiments of the invention are described in detail below with regard to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

Furthermore, unless otherwise specified, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein and unless otherwise specified, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis, unless otherwise specified.

It is further noted that, unless otherwise specified, the term annular shall be interpreted to mean that the referenced object extends around a central opening so as to be generally toroidal or ring-shaped. It is not necessary for the object to be circular, nor does the object have to be continuous. Similarly, unless otherwise specified, the term toroidal shall not be interpreted to mean that the object must be circular or continuous.

DETAILED DESCRIPTION OF THE PREFERRED EMBODIMENTS

Overview

In a preferred embodiment of the present invention, a motorized pump assembly 10 is provided. The pump assembly 10 is preferably configured to act on a high-temperature fluid and, more particularly, a high-temperature liquid. Most preferably, the pump assembly 10 is a filter pump assembly associated with a fryer for food preparation, with the liquid being high-temperature cooking oil or grease.

Such oil or grease as it passes through the pump assembly 10 is preferably at least three hundred degrees Fahrenheit (300° F.) More preferably, the oil or grease is between about four hundred degrees Fahrenheit (400° F.) and about five hundred degrees Fahrenheit (500° F.) as it passes through the pump assembly 10. The principles of the present invention are applicable to fluids having higher or lower temperatures than those specified above, however.

Preferably, the pump assembly 10 includes a motor 12 and a pump 14. The motor 12 preferably broadly includes a rotor 16 rotatable about an axis, a stator 18, and a motor housing 20. The motor housing 20 preferably defines a motor chamber 22. The stator 18 and the rotor 16 are at least substantially received in the motor chamber 22.

In greater detail, the stator 18 preferably includes a core 24 and a plurality of coils 26 (both shown only schematically) wound about the core. The coils 26 preferably comprise electric wiring 28 (also shown only schematically). The rotor 16 preferably includes a motor shaft 30 and a plurality of magnets (not shown) at least substantially circumscribing the motor shaft 30. The motor shaft 30 preferably extends along and rotates about a motor axis. The magnets are, in turn, also preferably rotatable about the axis. The stator 18 preferably generally circumscribes the rotor 16, such that the motor 12 is an inner rotor motor. Outer rotor or dual rotor configurations are permissible according to some aspects of the present invention, however. Other alternative rotor and stator configurations (e.g., induction motor rather than permanent magnet) are also permissible according to principles of the present invention.

Preferably, the motor housing 20 includes a generally cylindrical shell 32 extending along the axis and a pair of axially spaced apart pump-end and opposite-end endshields 34 and 36, respectively, fixed relative to the shell 32 to substantially close the ends thereof. The shell 32 may be provided with ventilation slots 38, as shown, or the shell might alternatively be at least substantially continuous (e.g., devoid of ventilation slots or other openings) such that the motor is totally enclosed.

The shell 32, the pump-end endshield 34, and the opposite-endshield 36 preferably cooperatively at least substantially define the motor chamber 22. The motor may be provided with alternative or additional structure to define the motor chamber.

In a preferred embodiment, as illustrated, the motor 12 includes a bearing assembly 40. Furthermore, the pump-end endshield 34 includes an endshield hub 42 including a bearing housing 44 that supports the bearing assembly 40. More particularly, the bearing housing 44 preferably defines a bearing well 46 that receives the bearing assembly 40. The bearing assembly 40 preferably rotatably supports the motor shaft 30 (or, more broadly, the rotor 16) on the pump-end endshield 34.

In a preferred embodiment, the motor 12 additionally includes a second bearing assembly (not shown) that also rotatably supports the motor shaft 30 (or, more broadly, the rotor 16). More particularly, the opposite-end endshield 36 preferably includes a bearing hub (not shown) including a bearing housing (not shown) that defines a bearing well (not shown) for receiving the second bearing assembly. The second bearing may be omitted entirely or alternatively configured or disposed without departing from the scope of some aspects of the present invention, however.

Preferably, mounting structure 48 of any suitable form is provided for fixation of the pump assembly 10 to the fryer (not shown) or other associated structure.

The pump 14 preferably includes a pump housing 50 and a pump element 52. The pump housing 50 preferably in part defines a pump chamber 54 that at least substantially receives the pump element 52. The pump element 52 is preferably rotationally driven by the motor shaft 30 to act on a fluid (e.g., the preferred high-temperature oil).

More particularly, the pump housing 50 preferably comprises a main body 56 and a connection body 58 fixed directly to one another by means of fasteners 60 and provided with a seal 62 along an interface 64 therebetween. The main body 56 preferably at least substantially defines a generally cylindrical fluid-receiving well 66 sized and shaped to complement the pump element 52.

The connection body 58 preferably includes a cover 68 that substantially covers and encloses the well 66, such that the main body 56 and the cover 68 cooperatively define the pump chamber 54. The cover 68 may be discrete, as shown, or integrally formed with the remainder of the connection body 58, without departing from the scope of the present invention.

The pump 14 is preferably a roller vane or roller cell pump, with the pump element 52 preferably comprising a generally toroidal pump rotor 70 and accompanying rollers 72. The pump rotor 70 preferably includes a centralized pump element hub 74 and a plurality of arcuately spaced apart vanes 76 extending generally radially outwardly from the pump element hub 74 to define a plurality of slots 78 therebetween. Each roller 72 is preferably disposed in a corresponding one of the slots 78 such that the rollers 72 and the vanes 76 cooperatively present a discontinuous outer margin 80 of the pump element 52.

In a preferred embodiment, the motor shaft 30 presents a keyed connection end 82 to which the pump rotor 70 is fixed. Thus, rotation of the motor shaft 30 drives rotation of the pump rotor 70 and ensuing displacement of fluid.

In greater detail still, connection body 58 preferably defines an inlet 84 and an outlet 86 in fluid communication with the pump chamber 54. More particularly, the connection body 58 preferably includes a radially inner pump housing hub 88. The connection body 58 further preferably includes inlet and outlet bosses 90 and 92, respectively, extending from the pump housing hub 88. The inlet and outlet bosses 90 and 92 each preferably extend generally radially from the pump housing hub 88 and are most preferably but not necessarily diametrically opposed so as to be generally in line with each other.

In a preferred embodiment, the inlet boss 90 defines a first portion 84*a* of the inlet 84. The inlet boss 90, the pump housing hub 88, and the cover 68 cooperatively define second and third portions 84*b* and 84*c* of the inlet 84. The cover 68 preferably defines an inlet slot 94 that defines a fourth portion 84*d* of the inlet 84. Each of the inlet portions 84*a,b,c,d* is preferably fluidly interconnected with and disposed orthogonally relative to the adjacent portions, such that the inlet 84 is labyrinthine. More particularly, the first and third portions 84*a* and 84*c* preferably extend generally radially, whereas the second and fourth portions 84*b* and 84*d* extend generally axially.

In a similar manner but with contrasting sequentiality, the cover 68 preferably defines an outlet slot 96 that defines a first portion 86*a* of the outlet 86. The outlet boss 92, the pump housing hub 88, and the cover 68 cooperatively define second and third portions 86*b* and 86*c* of the outlet 86. The outlet boss 92 defines a fourth portion 86*d* of the outlet 86. Each of the outlet portions 86*a,b,c,d* is preferably fluidly interconnected with and disposed orthogonally relative to the adjacent portions, such that the outlet 86 is labyrinthine. More particularly, the first and third portions 86*a* and 86*c* preferably extend generally radially, whereas the second and fourth portions 86*b* and 86*d* extend generally axially.

The inlet 84 is preferably fluidly interconnected with the pump chamber 54, which in turn is fluidly interconnected with the outlet 86. More particularly, in a preferred embodiment, fluid enters the pump chamber 54 via the inlet 84 and is driven through the outlet 86 by means of the pump element 52, with the inlet 84, the pump chamber 54, and the outlet 86 thereby defining a primary flow path 98.

As will be understood by those of ordinary skill in the art, piping, tubing, or other flow-directing structures (not shown) are preferably interconnected to the inlet and outlet bosses 90 and 92 to extend the flow path 98. Furthermore, the pump housing and pump element may be alternatively configured without departing from the spirit of the present invention. For example, the pump element could alternatively be an impeller wheel, axial reciprocating piston, or other fluid-moving component. The pump housing need only be configured to at least substantially house the pump element and therefore may have any suitable design complementary to the alternative pump element. That is, the pump housing can otherwise be designed as desired.

In a preferred embodiment, as noted previously, the motor shaft 30 extends into the pump chamber 54 to be fixedly interconnected with the pump rotor 70. More particularly, the pump-end endshield 34 defines a motor housing shaft opening 100. The connection body 58 of the pump housing 50 and, more preferably, the cover 68 and the pump housing hub 88 thereof, cooperatively define a pump housing shaft opening 102. The motor shaft 30 preferably extends from the motor chamber 22, through the motor housing shaft opening 100, through the pump housing shaft opening 102, and into the pump chamber 54, wherein it engages the pump element 52. Such engagement could be in a direct manner as shown, or in an alternative direct or indirect manner (e.g., by means of an intermediary coupling element, etc.).

Preferably, the connection body 58 of the pump housing 50 directly engages the pump-end endshield 34. More particularly, in a broad sense, the pump-end endshield 34 preferably presents an annular, generally radially extending main face 104 facing the pump 14 and an axially opposite face 106 facing the motor chamber 22. A pilot boss 108 preferably projects axially from the main face 104 toward the pump 14.

The pilot boss 108 is preferably but not necessarily generally cylindrical and presents a generally axially extending outer circumferential face 110 and a generally radially extending end face 112.

The connection body 58 preferably includes a mounting flange 114. The mounting flange 114 preferably presents a generally radially and circumferentially extending mounting face 116. The mounting flange 114 also preferably defines a shoulder 118 axially spaced from the mounting face 116 by an axially extending inner circumferential face 120.

Preferably, the mounting face 116 circumscribes or at least substantially circumscribes the pilot boss 108 and directly abuts the main face 104. The inner circumferential face 120 preferably circumscribes or at least substantially circumscribes and directly abuts the outer circumferential face 110. The shoulder 118 preferably engages the end face 112.

Preferably, the pump housing hub 88 and the endshield hub 42, at least in part due to the above-described engagement configuration between the connection body 58 and the pump-end endshield 34, cooperatively at least in part define an overflow chamber 122 adjacent the pump chamber 54. More particularly, the pump housing hub 88 includes a generally radially extending end wall 124 and a circumferential sidewall 126 extending generally axially from the end wall 124 toward the motor 12 to at least in part define the shoulder 118. That is, the mounting flange 114 and the sidewall 126 are at least in part coextensive. Thus, the end wall 124, the sidewall 126, and the pilot boss 108 cooperatively define the overflow chamber 122. (Alternatively stated, the mounting flange 114 in part defines the overflow chamber 122.)

Preferably, as will be apparent from the above description, the overflow chamber 122 is disposed between the pump chamber 54 and the motor chamber 22. Most preferably, the overflow chamber 122 is disposed axially between the pump chamber 54 and the motor chamber 22. Furthermore, in keeping with the above, the motor shaft 30 preferably extends through the overflow chamber 122 in the course of its extension from the motor chamber 22 to the pump chamber 54.

Sealing of Pump Assembly

In a preferred embodiment, a seal assembly 128 is provided to at least substantially restrict undesirable flow of fluid from the pump chamber 54 into the overflow chamber 122 and, in turn, into the motor chamber 22. More particularly, the seal assembly 128 includes a pump chamber seal 130, a pump chamber seal shield 132 engaging the pump chamber seal 130 along a motor-facing side 130*a* thereof, a spring 134, a motor chamber seal 136, and a motor chamber seal shield 138 engaging the motor chamber seal 136 along a pump-facing side 130*a* thereof.

Preferably, the pump chamber seal 130 sealingly engages the pump housing 50. More particularly, the pump housing hub 88 preferably defines a pump seal housing 140 that supports the pump chamber seal 130 and shield 132. More particularly, the pump seal housing 140 preferably defines a pump seal well 142 that receives the pump chamber seal 130 and shield 132. The pump chamber seal 130 circumscribes the motor shaft 30 and engages the end wall 124 of the pump housing hub 88 such that leakage past the pump chamber seal 130 into the overflow chamber 122 is at least substantially prevented.

It is noted that the pump chamber seal 130 may contact the motor shaft 30 to form a dynamic seal therewith, as illustrated, or, alternatively, be slightly spaced from the motor shaft to allow free rotation thereof while maintaining a functional barrier against outflow of fluid from the pump chamber 54 into the overflow chamber.

Similarly, as illustrated, the motor chamber seal 136 sealingly engages the motor housing 20. More particularly, the endshield hub 42 preferably defines a motor seal housing 144 adjacent the bearing housing 44 and nearer the pump assembly 10. The motor seal housing 144 supports the motor chamber seal 136 and shield 138. More particularly, the motor seal housing 144 preferably defines a motor seal well 146 that receives the motor chamber seal 136 and shield 138. The motor chamber seal 136 circumscribes the motor shaft 30 and engages the endshield hub 42 (i.e., the pump-facing side 130a of the pump-end endshield 34) such that leakage past the motor chamber seal 136 into the motor chamber 22 (i.e., from the overflow chamber 122) is at least substantially prevented.

It is noted that the bearing housing 44 and the motor seal housing 144 preferably each include a generally annular divider wall 147 disposed between the bearing assembly 40 and the motor chamber seal 136.

It is noted that the motor chamber seal 136 may contact the motor shaft 30 to form a dynamic seal therewith, as illustrated, or, alternatively, be slightly spaced from the motor shaft to allow free rotation thereof while maintaining a functional barrier against outflow of fluid from the pump chamber into the overflow chamber.

The spring 134 preferably extends between and engages each of the shields 132 and 138 to apply axial forces thereto and, in turn, to the respective adjacent seals 130 and 136. Such axial biasing preferably aids in formation and retention of secure sealing between the hubs 88 and 44 and the respective seals 130 and 136.

However, although the above-described seal assembly 128 is preferred, any one or more of a variety of sealing mechanisms fall within the scope of some aspects of the present invention. Seals may also be omitted entirely without departing from the scope of some aspects of the present invention.

Pump Mounting

As noted previously, the pump housing 50 preferably engages the pump-end endshield 34. Most preferably, the pump housing 50 is fixed to the pump-end endshield 34 by means of a plurality of pump fasteners 148. More particularly, the pump housing 50 (and still more particularly, the mounting flange 114) preferably includes a pair of diametrically opposed mounting bosses 150, each of which defines a pump mounting aperture 152 therethrough. The pump-end endshield 34 preferably defines a plurality of pump mounting holes 154. The pump fasteners 148 preferably extend through corresponding ones of the pump mounting apertures 152 and holes 154 to secure the pump 14 to the motor 12.

Preferably, two (2) diametrically opposed mounting bosses 150a,b and, in turn, mounting apertures 152a,b, are provided. In contrast, in a preferred embodiment, four (4) pump mounting holes 154a,b,c,d are preferably defined. Furthermore, the pump mounting holes 154a,b,c,d are preferably arranged in an evenly arcuately spaced apart manner so as to be spaced every ninety degrees (90°). In such a preferred embodiment, the pair of mounting apertures 152a,b are configured to correspond with both of two (2) diametrically opposed subsets of the mounting holes 154a,b,c,d. That is, the pump 14 may be mounted in four (4) distinct, ninety-degree-offset (90°—offset) orientations: (1) alignment of mounting aperture 152a with mounting hole 154a and mounting aperture 152b with mounting hole 154c; (2) alignment of mounting aperture 152a with mounting hole 154b and mounting aperture 152b with mounting hole 154d; (3) alignment of mounting aperture 152a with mounting hole 154c and mounting aperture 152b with mounting hole 154a; and (4) alignment of mounting aperture 152a with mounting hole 154d and mounting aperture 152b with mounting hole 154b. Such orientability is advantageous for reasons to be discussed in greater detail below.

It is particularly noted that, as used herein, a "subset" of the mounting holes 154 includes fewer of the mounting holes 154 than are present in total. Furthermore, one or more of the mounting holes 154 may be included in more than one subset.

As will be apparent to one of ordinary skill in the art based on the above-described preferred embodiment, several preferred generalized features or characteristics associated with pump mounting may be identified. For instance, it is preferred that there are an equal number of pump mounting bosses 150, apertures 152, and fasteners 148. It is preferred that there are fewer pump mounting bosses 150, apertures 152, and fasteners 148 than pump mounting holes 154, such that at least one of the pump mounting holes 154 is devoid of a fastener extending therethrough. It is also preferred that pump mounting holes 154 comprise a plurality of subsets (which may or may not in part overlap), each of which corresponds to the mounting bosses 150, apertures 152, and fasteners 148. However, more or fewer bosses, apertures, fasteners, and/or holes may be provided than discussed above. Furthermore, the bosses, apertures, fasteners, and/or holes may or may not be diametrically opposed and/or evenly arcuately spaced apart.

Thus, while the illustrated configuration described in detail above is most preferred, it will be understood by those of ordinary skill in the art that aspects of the present invention apply to alternatively configured pump mounting bosses, apertures, and holes. For instance, two diametrically opposed mounting bosses and two diametrically opposed apertures might be provided, as described above; but the endshield might provide six (6) evenly arcuately spaced apart mounting holes that define three (3) subsets corresponding to the bosses, apertures, and holes. Such an arrangement would enable six (6) distinct orientations of the pump. Alternatively, the mounting holes might not be evenly arcuately spaced apart but still form subsets corresponding to the configuration of the bosses and apertures. In yet another alternative, the connection body of the pump housing might include three (3) bosses and apertures configured for correspondence with two (2) or more subsets of three (3) holes each in the pump-end endshield.

Furthermore, although it is preferred, as discussed above, for there to be fewer pump mounting bosses, apertures, and fasteners than pump mounting holes, equal numbers are permissible according to some aspects of the present invention. It is also permissible according to some aspects of the present invention for there to be more mounting bosses and apertures than pump mounting holes.

Management of Overflow Fluid

As noted above, the seal assembly 128 preferably is provided to at least substantially prevent leakage of fluid from the pump chamber 54 into the overflow chamber 122 and, in turn, from the overflow chamber 122 onto the bearing assembly 40 and into the motor chamber 22. However, as will be understood by those of ordinary skill in the art, seal assemblies may in some circumstances leak due to any one or more of a variety of factors, including but not limited to shifting of relevant components, seal material wear and/or degradation, wear of other relevant components, thermal expansion and contraction, abnormal loading or other operational parameters, etc. Thus, in the illustrated preferred pump assembly 10, secondary mechanisms are provided to cope with any fluid leakage which may occur from the pump chamber 54 into the overflow chamber 122.

A first secondary mechanism is, in a broad sense, the provision of the previously introduced overflow chamber 122. Preferably disposed directly between the pump chamber 54 and the motor chamber 22, the overflow chamber 122 provides a buffer between the pump chamber 54 and the motor chamber 22. Preferably, any fluid that leaks past the pump chamber seal 130 is captured in the overflow chamber 122.

Furthermore, in a preferred embodiment, as illustrated, the connection body 58 of the pump housing 50 defines a pair of drainage slots 156*a,b* in fluid communication with the overflow chamber 122. In some circumstances, fluid captured in the overflow chamber 122 may eventually drain from the overflow chamber 122 to the environment or ambient (i.e., generally to the exterior of the pump assembly 10) via one or both of the drainage slots 156*a,b*, thus defining a secondary flow path 157.

Preferably, two (2) diametrically opposed slots are provided, although more or fewer slots and alternative arrangements thereof are permissible according to some aspects of the present invention.

As will be readily apparent to those of ordinary skill in the art, the efficiency or, more broadly, the effectiveness of the drainage slots 156*a,b* will be at least in part dependent on their orientation. For instance, orientation so as to be horizontally spaced apart, as illustrated, would enable significant pooling of fluid to occur in the overflow chamber 122 before the drainage slots 156*a,b* would provide relief. Orientation providing vertical spacing, in contrast, would utilize gravity and structural details to direct fluid quickly to the lower of the two (2) slots, with the upper slot being largely inactive.

The above-described orientability of the pump housing 50 on the pump-end endshield 34 therefore preferably enables advantageous orientation of the drainage slots 156*a,b* to manipulate the flow or placement of any leaked fluid entering or having entered the overflow chamber 122.

As alluded to above, however, in some instances, fluid may not efficiently exit the overflow chamber 122 via the drainage slots 156, whether due to the chosen orientation of the pump housing 50 or other factors. For instance, the fluid might travel along the motor shaft 30 toward the bearing assembly 40 and the motor chamber 22 rather than dripping or spraying into the overflow chamber 122 in a general sense. Although the motor chamber seal 136 is provided, as noted above, to at least substantially fend off such an advance from extending to the bearing assembly 40 and/or the motor chamber 22, additional control means are again preferred.

It is noted that such additional control means are particularly desirable in high-temperature fluid applications, since, as discussed above, high temperatures may have significantly detrimental effects on the bearing assembly 40.

With detailed regard to such control means, in a preferred embodiment, the pump-end endshield 34 defines a drainage channel 158 fluidly interconnected with the overflow chamber 122 and configured to direct fluid from the overflow chamber 122 away from the bearing assembly 40 and the motor chamber 22.

The drainage channel 158 thereby in part defines a tertiary flow path 159.

Preferably, as illustrated, the pilot boss 108 and the main face 104 cooperatively at least in part define the drainage channel 158, which preferably extends from a start 160 adjacent the motor shaft 30 and the motor chamber seal 136 to an end 162 at a radially outermost margin 164 of the pump-end endshield 34.

Furthermore, although it is permissible according to some aspects of the present invention for the drainage channel to extend to an additional reservoir or chamber of some sort, it is preferred as illustrated that the outermost margin 164 be adjacent the environment or ambient. That is, the drainage channel 158 preferably extends to a generally open area.

It is particularly noted that the above-described features of the mounting flange 114, including the structures thereof that engage the pump-end endshield 34, are such that the mounting flange 114 preferably directs fluid from the overflow chamber 122 into the drainage channel 158.

In a preferred embodiment, the drainage channel 158 includes an entry portion 158*a* extending generally axially toward the motor 14 and a main portion 158*b* that extends generally straight and in a generally radially outward manner from the entry portion 158. Preferably, the entry portion 158*a* is small in comparison to the main portion 158*b*, such that the drainage channel 158 may be characterized as being substantially straight. However, curves, zig-zags, and other overall directions of extension are permissible according to some aspects of the present invention, however.

Preferably, in keeping with a preferred orientation of the pump-end endshield 34, the drainage channel 158 extends generally orthogonally relative the motor shaft 30. However, skewed dispositions are permissible according to some aspects of the present invention.

Preferably, the pump assembly 10 (or, more specifically, the pump-end endshield 34 thereof) is oriented during operation such that the drainage channel 158 extends generally downwardly. Such downward extension is preferably nearly perfectly vertical, as illustrated, although downward slanting is permissible according to some aspects of the present invention. In such orientations, gravity will thus assist in the removal of any leaked fluid via the drainage channel 158.

Furthermore, although the drainage channel 158 is recessed in the pump-end endshield 34 (i.e., recessed relative to the main face 104 and the end face 112), the channel might in alternative embodiments be defined in whole or in part by additional structure that might project axially past the main and end faces of the pump-end endshield and pilot boss, respectively.

In a preferred embodiment, a plurality of outer recesses 166 are provided along the outermost margin 164 of the pump-end endshield 34. The drainage channel 158 preferably intersects and thus in part defines one of said recesses 166. The recesses may be omitted without departing from the scope of some aspects of the present invention, however.

As shown, it is permissible for a pump mounting hole 154 to intersect the drainage channel 158. However, it is also permissible according to some aspects of the present invention for the drainage channel and the pump mounting holes to be offset to avoid such intersection.

Furthermore, although the start 160 is preferably spaced radially outwardly from the motor seal well 146, it is permissible according to some aspects of the present invention for the drainage channel to extend directly from the motor seal. That is, the drainage channel might extend completely through the pilot boss to be in fluid communication with the motor seal well.

It is particularly noted that, as will be apparent to those of ordinary skill in the art, the drainage channel 158 is disposed along the main face 104 (i.e., as opposed to the motor chamber-facing opposite face 106) of the pump-end endshield 34. Thus, each of the motor chamber seal 136, the drainage slots 156, and the drainage channel 158 are disposed axially outside the motor chamber 22 and in one axial direction from the bearing assembly 40 and the motor chamber 22. More particularly, the motor chamber seal 136 is disposed axially between the drainage slots 156 and drainage channel 158 on one side, and the bearing assembly 40 and motor chamber 22 on the other. Thus, the drainage slots 156 and the drainage channel 158 preferably act to redirect any leaked fluid from the pump chamber 54 prior to such fluid reaching the motor chamber seal 136, with the seal 136 acting to block and redirect any not-yet-redirected fluid through either of both of the drainage slots 156 and the drainage channel 158.

Figure 1:
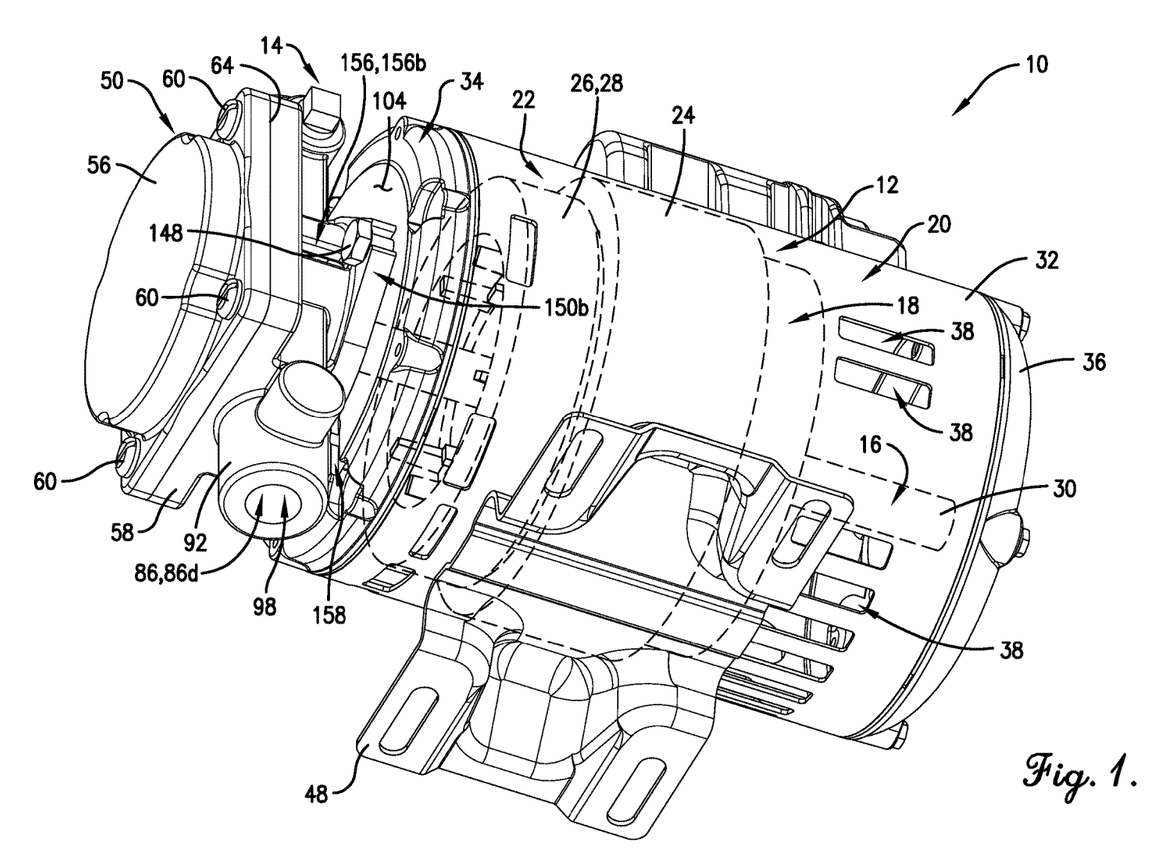
FIG. 1 is a perspective view a motorized pump assembly in accordance with a preferred embodiment of the present invention.
Figure 2:
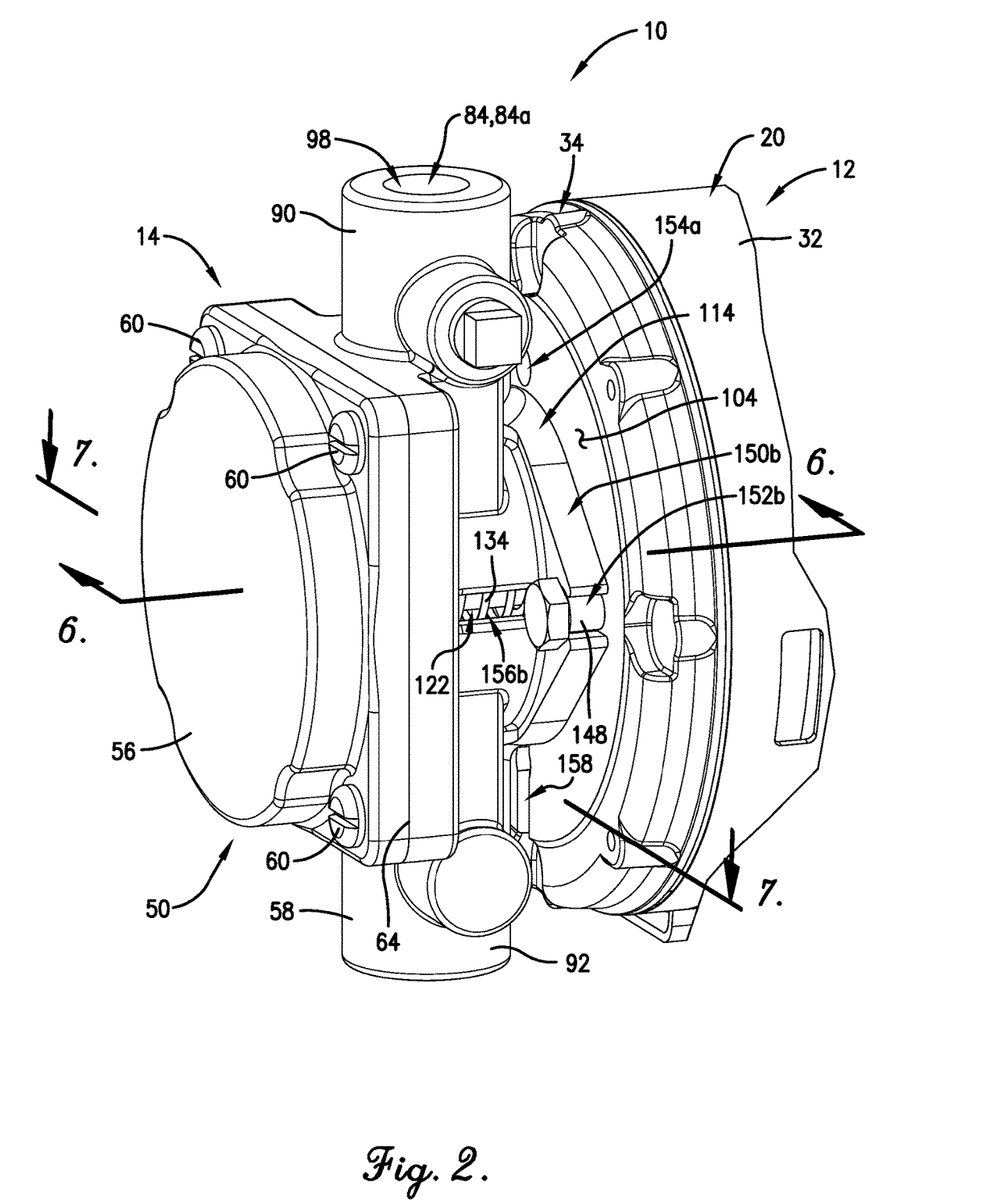
FIG. 2 is an enlarged, perspective view of the pump end of the assembly of FIG. 1.
Figure 3:
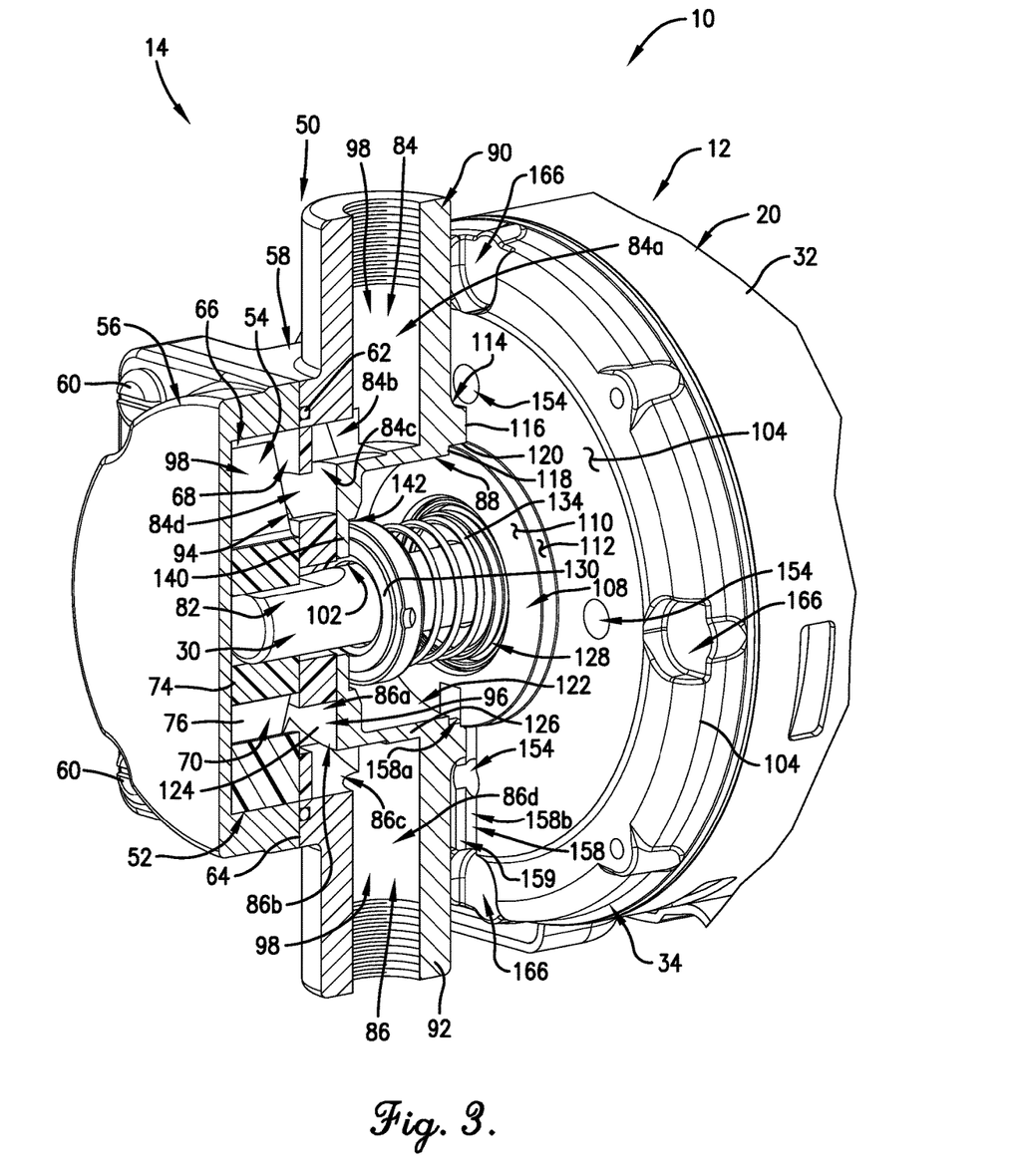
FIG. 3 is a partially sectioned view of the pump end of FIG. 2.
Figure 4:
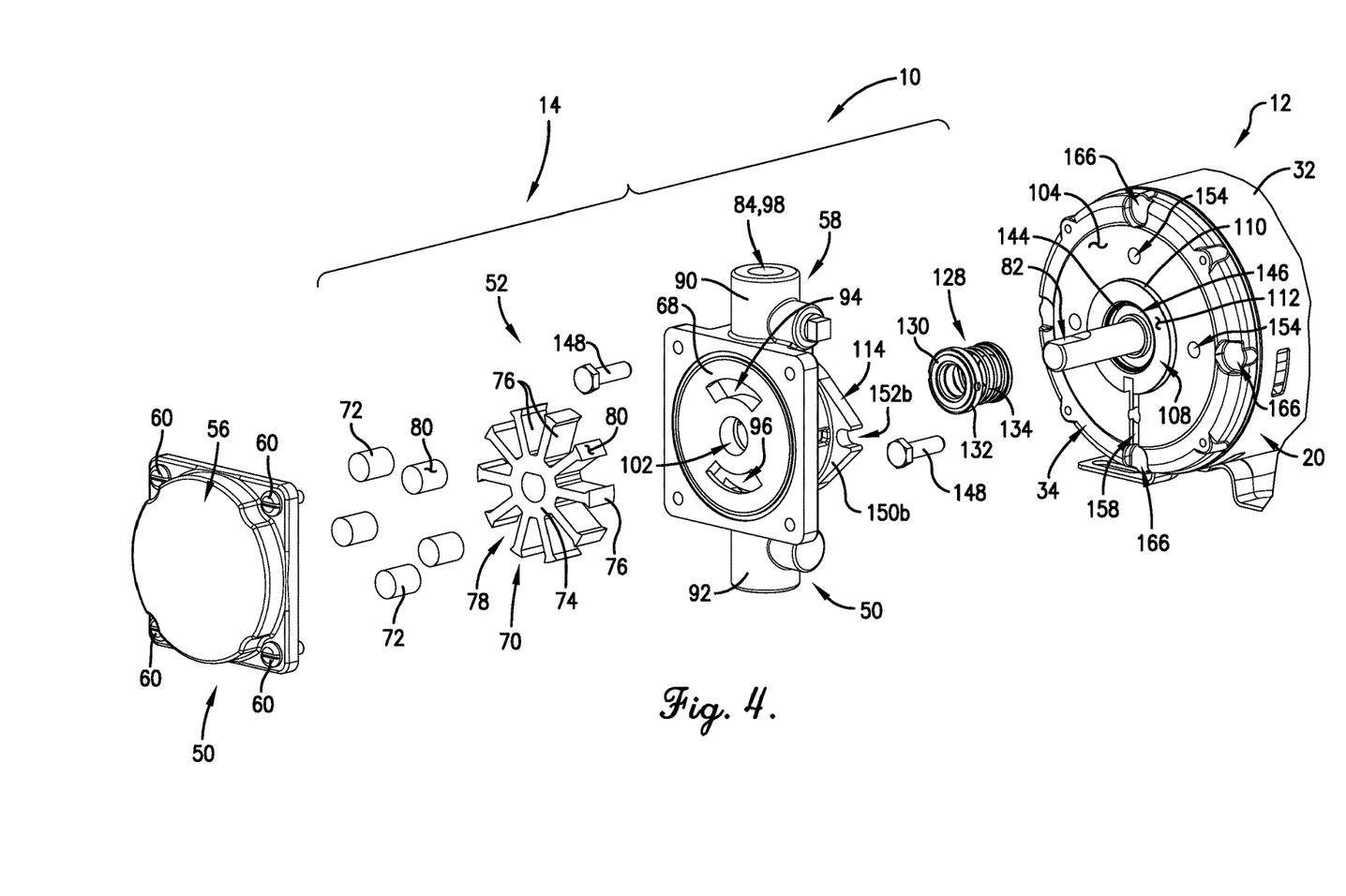
FIG. 4 is partially exploded perspective view of a portion of the pump assembly of FIGS. 1-3.
Figure 5:
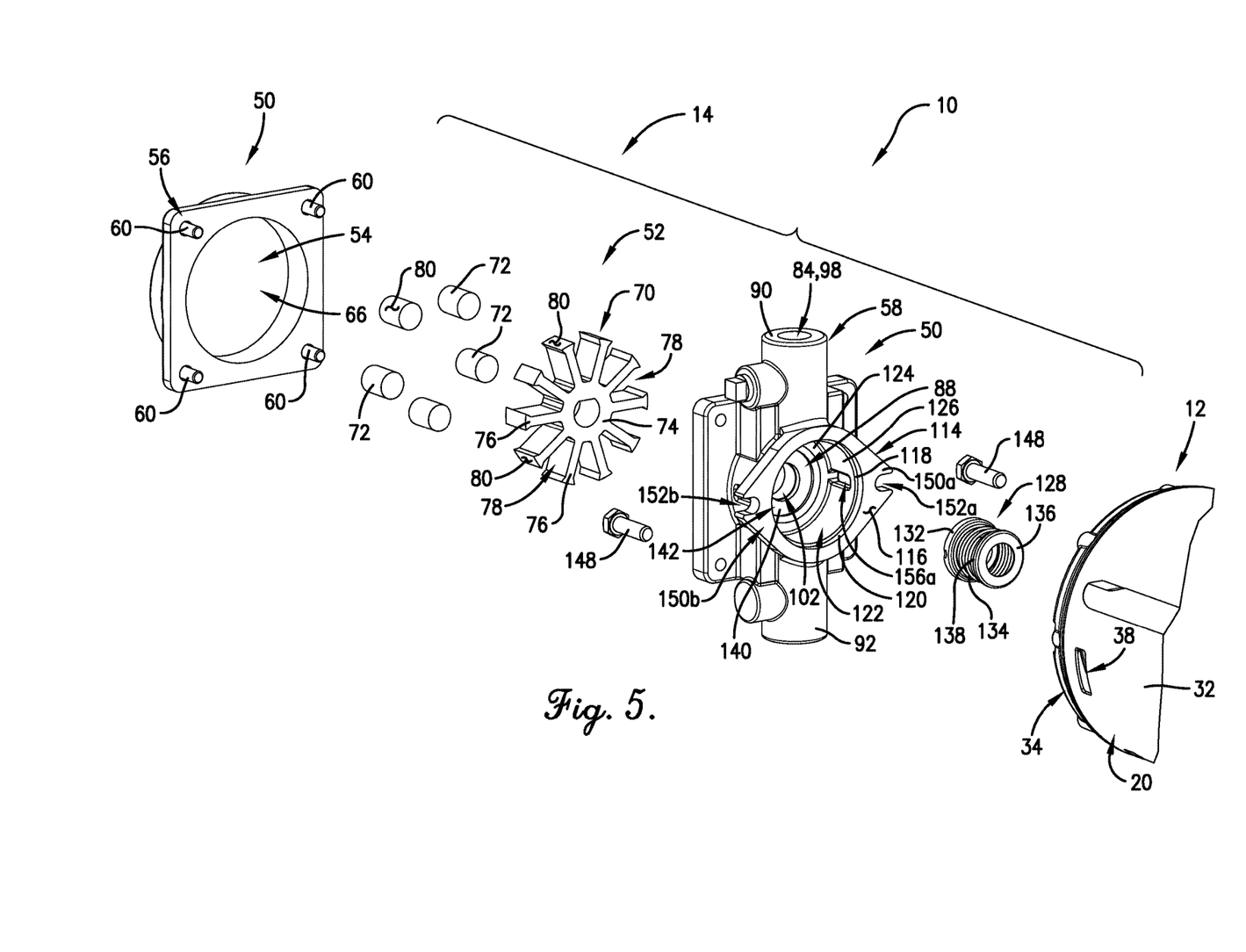
FIG. 5 is an oppositely oriented, partially exploded perspective view of the pump assembly portion of FIG. 4.
Figure 6:
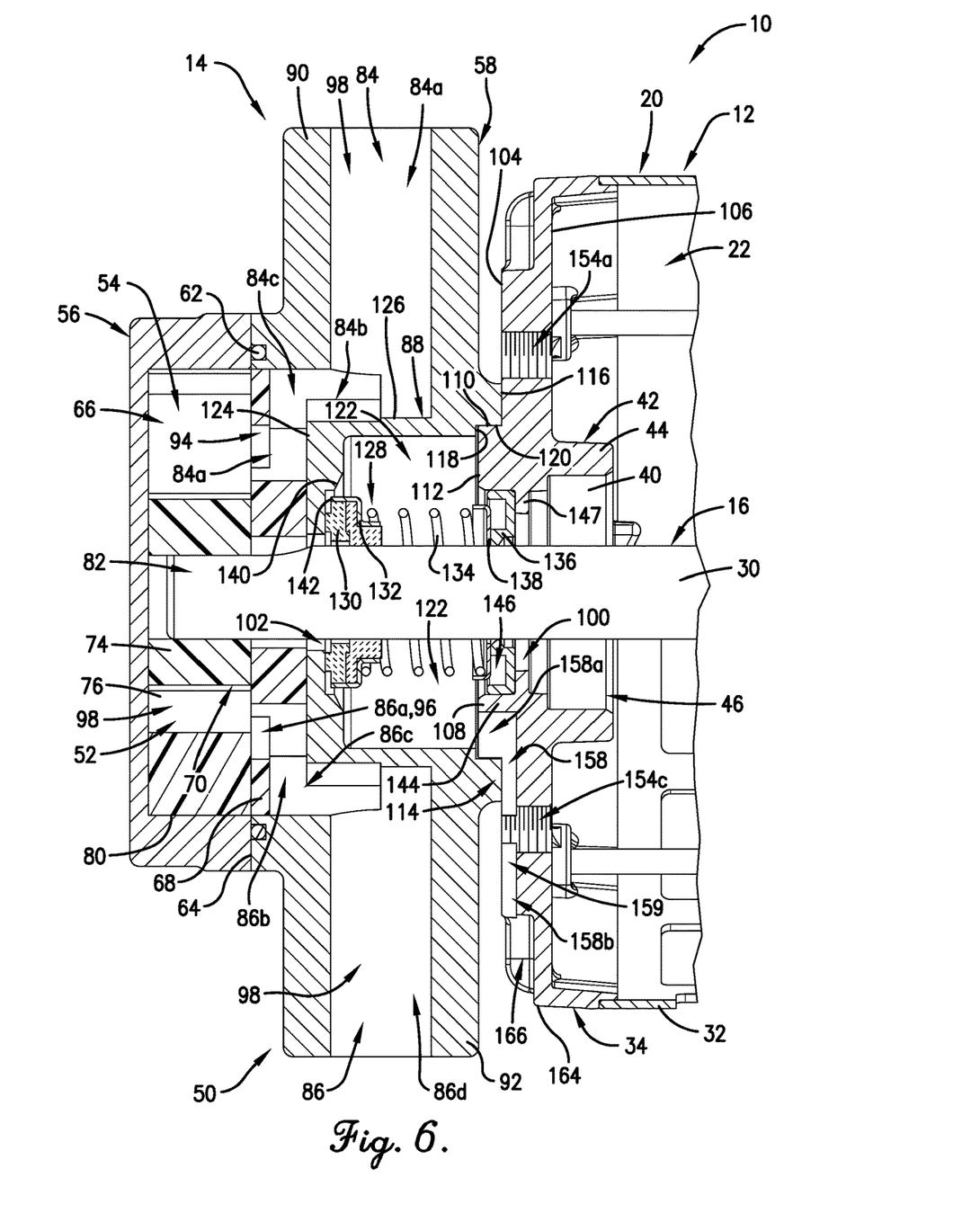
FIG. 6 is a cross-sectional view of the pump end of the assembly taken along line 6-6 of FIG. 2.
Figure 7:
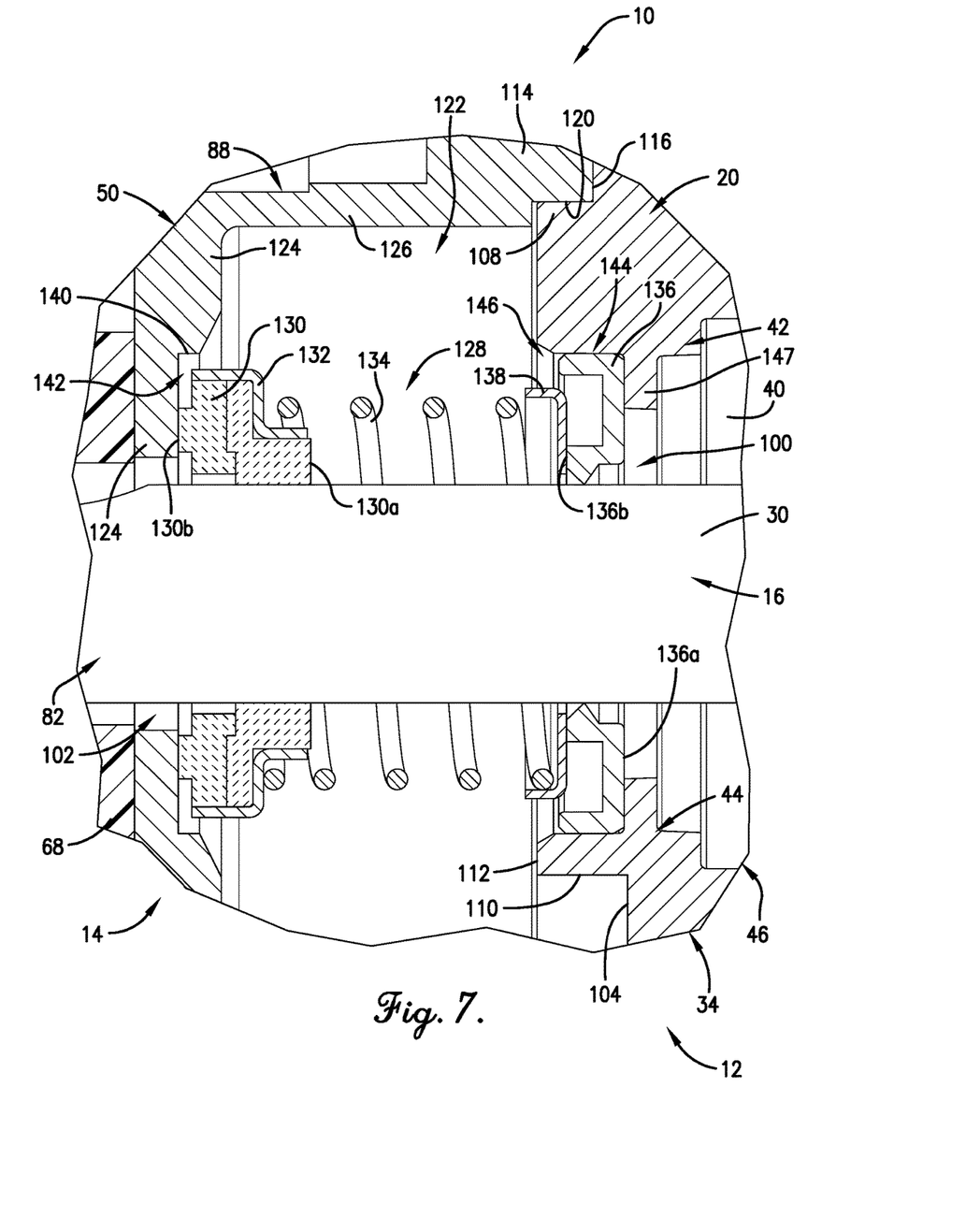
FIG. 7 is an enlarged cross-sectional view of a portion of the pump end of the assembly taken along line 7-7 of FIG. 2, particularly illustrating the engagement of the pump housing and the adjacent endshield.
Figure 8:
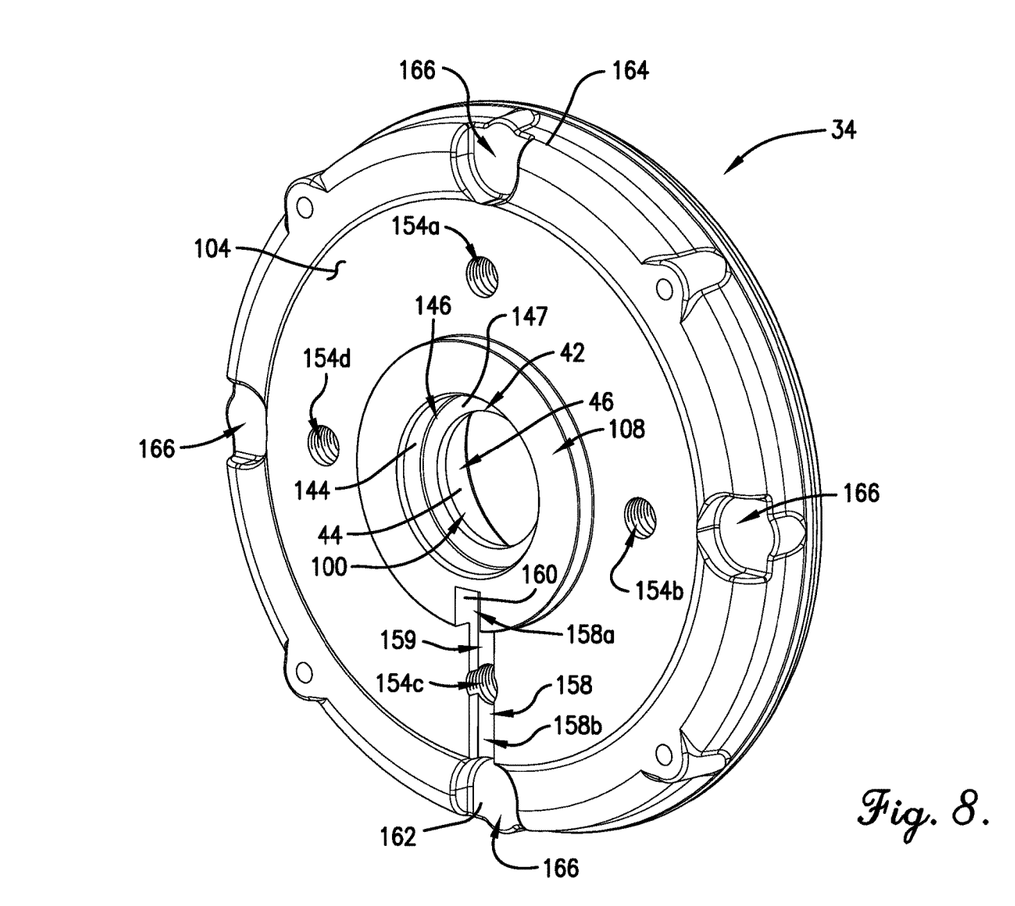
FIG. 8 is an enlarged perspective view of the pump-end endshield.
Figure 9:
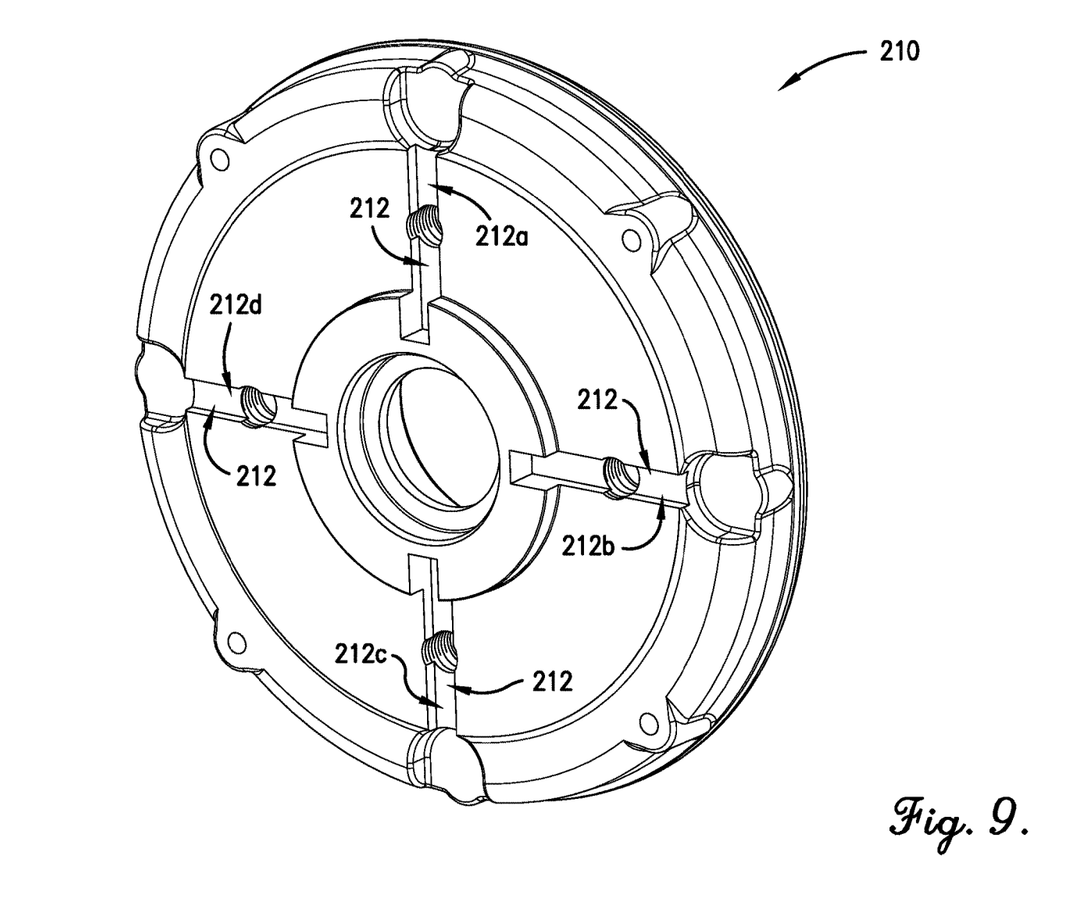
FIG. 9 is an enlarged perspective view of a pump-end endshield in accordance with a second preferred embodiment of the invention.

A second preferred embodiment of the pump-end endshield 210 is shown in detail in FIG. 9. It is initially noted that, with certain exceptions to be discussed in detail below, many of the elements of the pump-end endshield 210 are the same as or very similar to those described in detail above in relation to the pump-end endshield 34. Therefore, for the sake of brevity and clarity, redundant descriptions and numbering will be generally avoided here. Unless otherwise specified, the detailed descriptions of the elements presented above with respect to the pump-end endshield 34 should therefore be understood to apply at least generally to the pump-end endshield 210, as well.

As noted previously, the pump-end endshield 34 preferably includes a single drainage channel 158, disposed so as to define a gravitationally aided downward drainage path. In contrast, in a second preferred embodiment, the pump-end endshield 210 includes a plurality of drainage channels 212. The drainage channels 212 are preferably evenly arcuately spaced apart, although uneven spacing is permissible according to some aspects of the present invention. Preferably, four (4) drainage channels 212 are provided, although more or fewer may be provided without departing from the scope of some aspects of the present invention.

Preferably, a pair 212a,c of the drainage channels 112 are nearly perfectly vertically oriented, while another pair 212b,d of the drainage channels 112 are nearly perfectly horizontally oriented when the motor is in operation.

As shown, each of a plurality of pump mounting holes 214 is preferably disposed in a corresponding one of the drainage channels 212. However, it is permissible according to some aspects of the present invention for one of more of the pump mounting holes to be formed separately from any of the drainage channels.

The pump-end endshield 210 is preferably at least substantially symmetrical about the axis of rotation of the motor. That is, the pump-end endshield may be mounted without "clocking" (i.e., in any orientation allowed by the provided mounting structure, such as the mounting holes 214), since any allowed mounting orientation will result in an at least substantially identical distribution and orientation of the drainage channels 212.

The pump-end endshield 210 is also particularly advantageous in enabling any of multiple orientations to provide at least one drainage channel 212 that extends generally downwardly. That is, in contrast to the pump-end endshield 34 in which provision of only a single drainage channel 158 necessitates careful orientation to reap the benefits of gravity (whether via substantially perfect verticality of the drainage channel 158, as shown, or downward slanting thereof), the pump-end endshield 210 can be mounted in multiple orientations while maintaining a single, nearly perfectly vertically downward drainage channel 212 (i.e., drainage 212c, as illustrated) or a pair of partially downwardly oriented (i.e., downwardly slanted) drainage channels.

CONCLUSION

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motorized pump assembly comprising:
a pump configured to act on a fluid,
said pump including a pump housing that at least in part defines a pump chamber; and
a motor for driving said pump,
said motor including a stator, a rotor rotatable about an axis, a motor housing, and a bearing assembly,
said rotor including a motor shaft extending along the axis,
said motor housing including an endshield that at least in part defines a motor chamber in which the stator and the rotor are at least substantially received,
said bearing assembly rotatably supporting the motor shaft on the endshield,
said pump housing and said endshield being fixed to one another and cooperatively at least in part defining an overflow chamber adjacent the pump chamber,
said endshield defining a drainage channel fluidly interconnected with the overflow chamber and configured to direct fluid from the overflow chamber away from the bearing assembly,
said endshield defining a pump mounting hole,
said pump mounting hole intersecting the drainage channel.

2. The pump assembly of claim 1,
said drainage channel being recessed in said endshield.

3. The pump assembly of claim 1,
said endshield defining a main face and a pilot boss that projects from the main face toward the pump,
said pilot boss and said main face cooperatively at least in part defining the drainage channel,
said pump housing defining a mounting flange that in part defines the overflow chamber,
said mounting flange presenting a mounting face that at least substantially circumscribes the pilot boss and engages the main face, such that the mounting flange is configured to direct fluid from the overflow chamber into the drainage channel.

4. The pump assembly of claim 3,
said pilot boss presenting an end face,
said mounting flange further defining a shoulder engaging the end face.

5. The pump assembly of claim 1,
said drainage channel extending generally radially outwardly.

6. The pump assembly of claim 5,
said endshield presenting a radially outermost margin,
said drainage channel extending to the margin.

7. The pump assembly of claim 6,
said endshield defining a recess along the margin,
said drainage channel intersecting said recess.

8. The pump assembly of claim 6,
said drainage channel extending to ambient.

9. The pump assembly of claim 5,
said drainage channel extending generally orthogonally relative to the motor shaft.

10. The pump assembly of claim 1,
said drainage channel extending generally downwardly away from the bearing assembly.

11. The pump assembly of claim 1,
said drainage channel configured to direct fluid from the overflow chamber away from the motor chamber.

12. The pump assembly of claim 1,
said endshield defining a plurality of said drainage channels.

13. The pump assembly of claim 12,
said drainage channels being evenly arcuately spaced apart.

14. The pump assembly of claim 13,
said endshield defining four of said drainage channels.

15. The pump assembly of claim 13,
a first pair of said drainage channels extending in generally opposite radial directions and being generally vertically oriented, such that one of said drainage channels of the first pair extends generally downwardly,
a second pair of said drainage channels extending in generally opposite radial directions and being generally horizontally oriented.

16. The pump assembly of claim 1,
said endshield defining a plurality of said pump mounting holes,
said pump housing defining a plurality of pump mounting bosses,
said pump assembly including a plurality of pump fasteners extending through corresponding ones of the pump mounting bosses and into a subset of the pump mounting holes.

17. The pump assembly of claim 16,
said endshield defining four of said pump mounting holes,
said pump housing defining two of said pump mounting bosses,
said pump assembly including two of said pump fasteners.

18. The pump assembly of claim 16,
said pump mounting holes defining a plurality of subsets corresponding to the pump mounting bosses, such that the pump assembly may be mounted to the endshield in a plurality of orientations.

19. The pump assembly of claim 18,
said pump mounting holes being evenly arcuately spaced apart,
said pump mounting bosses being diametrically opposed.

20. The pump assembly of claim 1, further comprising:
a pump seal configured to at least substantially restrict flow of fluid from the pump chamber to the overflow chamber.

* * * * *